Mar. 27, 1923.  
S. G. SPURLING.  
STOWAWAY SIDE CURTAIN FOR VEHICLE TOPS.  
FILED OCT. 5, 1921.
1,449,630.
3 SHEETS—SHEET 1.
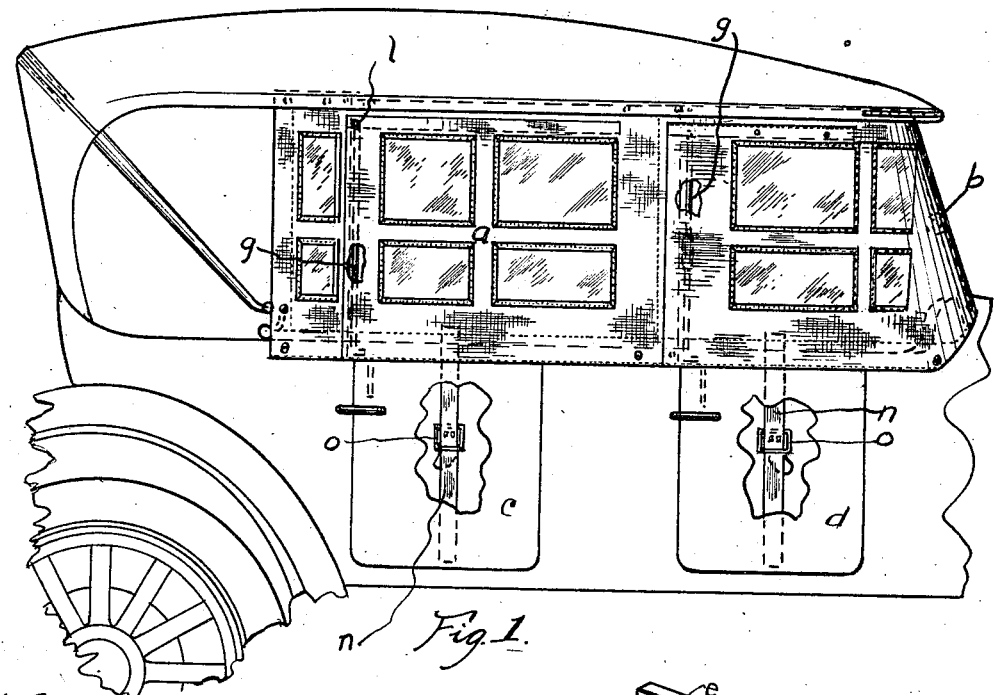
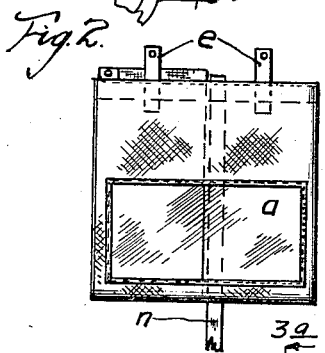
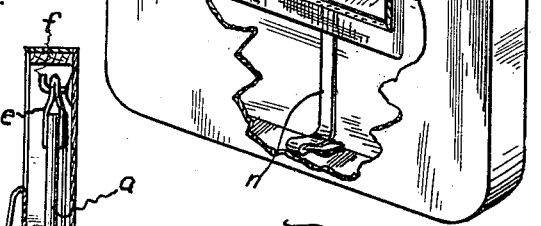
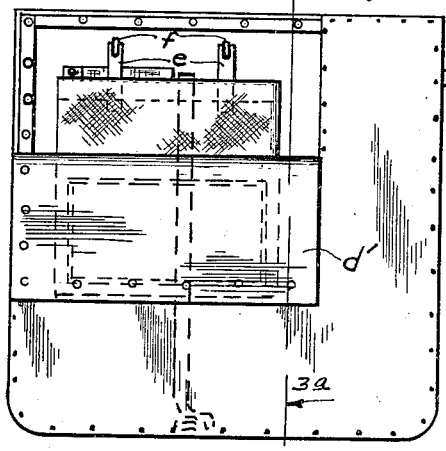
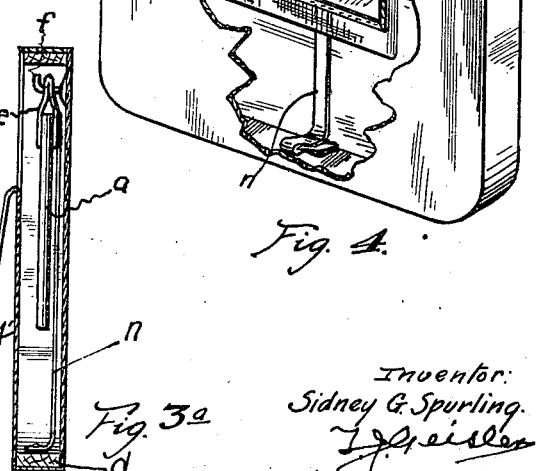
Inventor:  
Sidney G. Spurling.

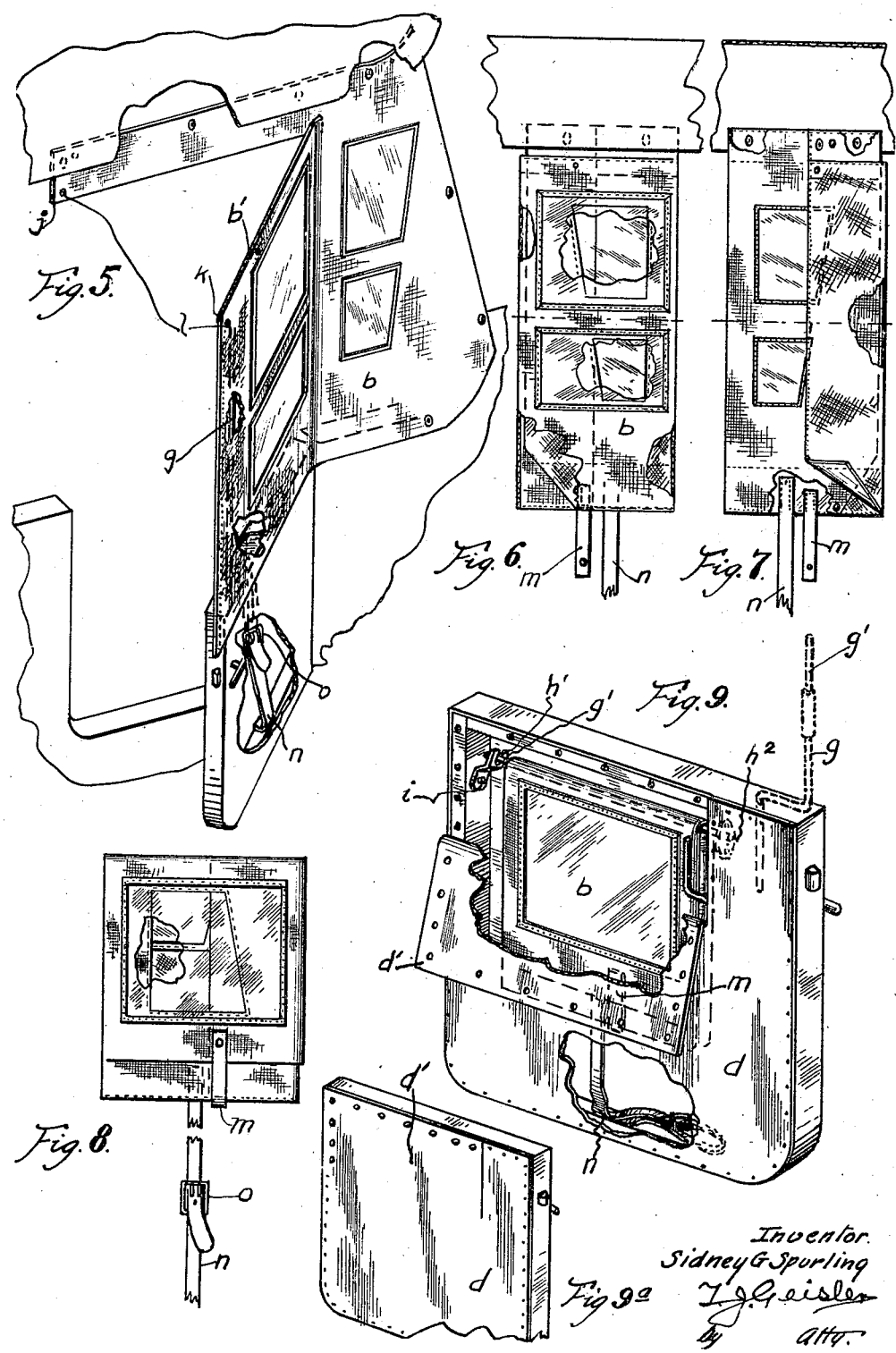

Mar. 27, 1923.
S. G. SPURLING.
STOWAWAY SIDE CURTAIN FOR VEHICLE TOPS.
FILED OCT. 5, 1921.

Inventor
Sidney G. Spurling
by _____
Atty

Patented Mar. 27, 1923.

1,449,630

UNITED STATES PATENT OFFICE.

SIDNEY G. SPURLING, OF PORTLAND, OREGON.

STOWAWAY SIDE CURTAIN FOR VEHICLE TOPS.

Application filed October 5, 1921. Serial No. 505,543.

*To all whom it may concern:*

Be it known that I, SIDNEY G. SPURLING, a citizen of the United States, and a resident of the city of Portland, county of Multnomah, and State of Oregon, have invented a certain new and useful Improvement in Stowaway Side Curtains for Vehicle Tops, of which the following is a specification.

My invention particularly relates to means for taking care of the side curtains of a demountable auto top when not in use.

Since it may be required to put up the side curtains at any time, the operation of putting them up should be simplified as much as possible.

Heretofore, side curtains have generally been so stowed away as not to be conveniently accessible. Even where pockets were provided for them it was necessary that the curtains first be assorted, so as to know where to put them; and the time so consumed, especially in stormy weather, was a source of annoyance.

The object of my invention is to remedy such annoyance, and to this end I provide a pocket on the inside of each door of the vehicle for the particular curtain which is to be put up adjacent to the door. This however, is not in itself sufficient, for the curtains may be inadvertently exchanged and put in the wrong pocket. To prevent this, I fasten each curtain in its pocket by means which will permit the curtain to be put up with the same freedom as if detached, yet, at the same time, preventing it from being taken away from its pocket.

This object of my invention may be attained by a strap fastened to the bottom of the curtain at one end and to the inside of the pocket at the other end; and the strap may consist of two sections buckled together so that the curtain may be removed for repair or renewal as required.

Another object of my invention is to provide means tending to keep the curtain in better shape, and thus prolong its life. If the curtain were just put in its pocket it would, with the jars of the vehicle, soon become crumpled in the bottom of the pocket, thus putting the curtain out of shape, and causing undue wear; perhaps breaking the celluloid window with which the curtain is provided.

Hence, the further object of my invention is to provide means for neatly hanging the curtain up when not in use, in its pocket, in such a way as to reduce its wear to a minimum. This requires that the curtain be folded into a suitable package so that it may be conveniently hung up in its pocket; and to this end I preferably so arrange the windows of the curtain that the frames thereof constitute a guide for the proper folding of the curtain.

A still further object of my invention is to obtain all the above mentioned results without marring the appearance of the car. I do this by providing concealed pocket; that is to say, the front wall of the pocket having an openable section, through which access is gained to the interior; such openable section normally having the appearance of being a fixed part of the door. An alternative construction is to hinge the top molding of the door; and so when this molding is in place, there would be no signs of a pocket except the breaks in the molding.

The manner in which I have carried my invention into practice is illustrated by the accompanying drawings, in which:

Fig. 1 is a side elevation of an automobile embodying my invention, with side curtains in place; parts being broken away to show details of my invention;

Fig. 2 shows a side curtain folded, so that it can be inserted in its pocket and hung up in the latter;

Fig. 3 is an elevation of the inside of door embodying my invention with the folded curtain hung on hooks provided in the pocket of the door;

Fig. 3ª is the transverse section taken on the line 3ª of Fig. 3.

Fig. 4 is a perspective looking at the interior of a door provided with parts, a curtain pocket; being broken away to show how the curtain is hung from a hinged section of the top molding of the door frame; such hinged section constituting the openable part or cover of the pocket;

Fig. 5 is a fragmentary perspective view of an automobile body and top embodying my invention; this view showing the front curtains in place with door opened;

Fig. 6 is an outside view of my front curtain, and illustrates how the ends of this curtain fold over each other, preparatory to making the final horizontal fold;

Fig. 7 is an inside view of the curtain shown in Fig. 6;

Fig. 8 shows one of the front curtains folded in its final form thereby reducing it to the required size for hanging in its pocket in the door; this view also showing the fastening strap *m* by which the overlying fold is secured in place;

Fig. 9 shows the folded curtain hung in place, in its pocket, by means of a rod, which is supported by two forked brackets provided at the sides of the pocket. This figure further illustrates a type of pocket normally concealed as above mentioned; the pocket as here shown has its openable section or cover turned back.

Figure 10:
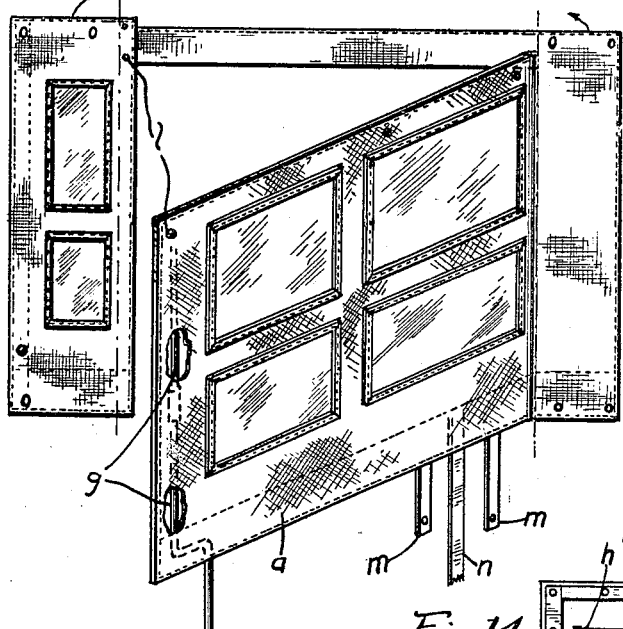
Figure 11:
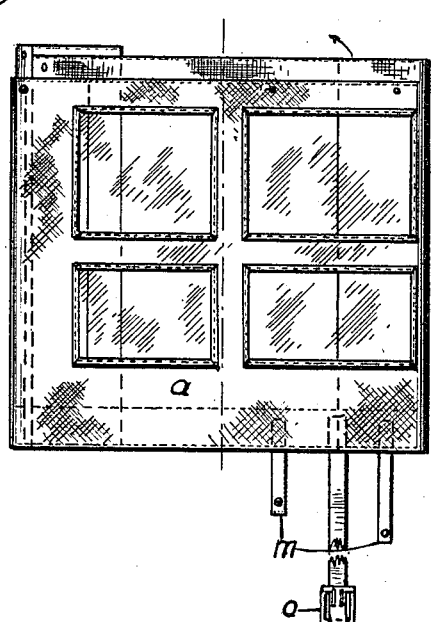

Fig. 9ª shows the appearance of the pocket when closed, and it will be noted that the opening section of this pocket appears as if a fixed part of the inside wall of the door;

Fig. 10 shows a detail of the construction of the side curtains suitable for the rear part of the vehicle; this view also shows my improved door rod as supporting one end of the hinged part of the side curtain on the door;

Fig. 11 is an outside view of my rear side curtain showing the first two folds of the latter preparatory to stowing this curtain away in its pocket.

Figure 12:
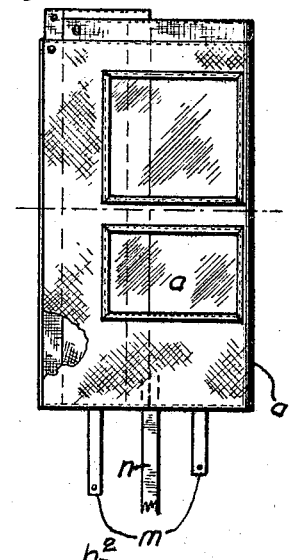
Figure 13:
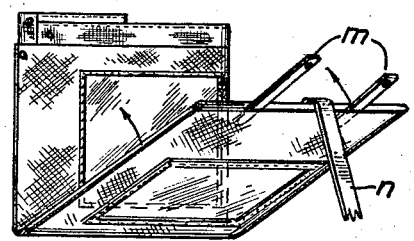

Fig. 12 shows the third fold;

Fig. 13 shows the manner of making the last fold; and

Figure 14:
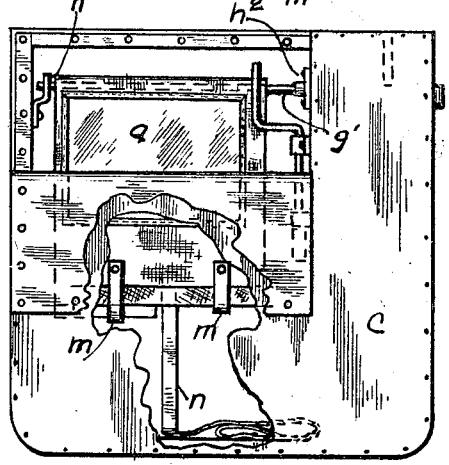

Fig. 14 is an inside elevation of a door provided with a concealed pocket which is shown opened, and parts are broken away to disclose other parts. This view also shows the bottom edge of the curtain as provided with straps for fastening down the overlying lap of the folded curtain.

I will describe the arrangement of the side curtains on the near side of the vehicle, referring to Fig. 1; the arrangement of my side curtains on the far side of the vehicle of course being the same.

The rear side curtain *a* is designed to be placed in the pocket of the rear door *c*, and the front side curtain *b* is designed to be placed in the pocket of the front door *d*.

In order to insert the side curtains in their respective pockets it is necessary that they be folded. The manner of folding the front curtain *b* is shown in Figs. 6, 7 and 8. It is to be noted that the curtain includes a hinge section *b'* which is supported on the door so as to open and close with the latter. When the curtain is to be removed the corners *j* and *k* are first snapped together, being held in place by a glove fastener *l*. Without removing the curtain from the top, it is then folded along vertical lines so as to assume the shape shown by Figs. 6 and 7. The curtain may then be removed and folded into the form shown by Fig. 8, thus arranging the curtain for being suspended in its pocket; the overlying flap of the folded curtain being secured in place by a fastening strap *m*.

A strap *n*, attached to the bottom of the curtain at one end, and at the other end to the inside of the pocket, and functions to prevent the curtain from being entirely removed from the pocket, at the same time permits the curtain to be withdrawn from its pocket, and put in place, with the same freedom as an ordinary curtain. When the curtain is folded and placed in its pocket, said holding strap *n* will arrange itself in the bottom of the pocket as shown in Fig. 9; and when the curtain is put up this holding strap *n* will extend just to the edge of the molding of the door. The inner wall *d'* of the door *d* can then be fastened in place and the pocket is concealed as previously mentioned. The holding strap is provided with a buckle *o*, so that it may be adjusted as to length, and also so to permit the removal of the curtain for repair, or renewal.

The curtain having been properly folded is then to be hung up in its pocket, in this way preventing it from being crumpled and unduly worn. The hanging of the curtain in its pocket may be done in different ways. As shown in Fig. 9, I provide a rod *g'* one end of which is supported by a forked bracket *h'* pivoting on a rivet *i* so that this bracket may be swung forward, and the rod *g'* inserted or removed. The opposite end of the rod *g'* is removably supported in a fixed bracket *h²*.

Instead of using a separate rod *g'*, the rod which is provided for supporting the free end of the hinged section *b'* of the side curtain on the door may be made in two pieces as shown by *g*, *g'* in Fig. 9, the upper piece *g'* being used for supporting the curtain as mentioned. The two pieces of this rod may be connected by any suitable means, for example—joint and socket, or thread and tap, as convenient.

In Figs. 10 to 14 I show the manner of folding and inserting the rear curtain *a* which is approximately the same as the manner and folding and inserting the front curtain. The rear curtain *a* is secured against removal from its pocket by means of a holding strap similar to *n*.

These curtains may be attached in the pockets so that they will not become crumpled or soiled either by the manner I show in Figs. 2, 3, 3ª and 4, or by the manner shown in Figs. 9 and 14.

Instead of hanging up the curtain in its pocket by a rod as *g'*, it may be hung up by straps *e* on hooks *f* as shown in Figs. 2, 3, 3ª and 4.

In Figs. 3 and 3ª I show how the pocket can be so constructed that the inside wall *d'* of the door *d* can be hinged, and thus permit the insertion of the folded curtain.

In Fig. 4 access is gained to the pocket by hinging a section *d²* of the top molding, in which hooks *f* are screwed for hanging up the curtain as mentioned. When the curtain has been inserted, and the hinged molding or cover $d^2$ has been closed the pocket will be substantially concealed.

The above described details of construction may of course, be varied as found convenient so long as the principle of my invention be adhered to. The details are, in fact, merely given to illustrate one mode in which my invention may be carried into practice.

I claim:

1. In a vehicle provided with a hollow door constituting a pocket for storing a curtain, the door having a hinged section at the top to provide an opening giving access to said pocket, the combination with said pocket of a side curtain adapted for arranging into a rectangular flat package suitable for inserting in said pocket, means for hanging the folded curtain flatwise within said pocket, a narrow strap connecting one end of the curtain with said pocket thereby preventing the carrying away of the curtain, but permitting its withdrawal from its pocket for putting up in place, said hinged section of the door being provided with fastening means spaced apart to receive said strap of the curtain between them when the latter is put up, whereby the said hinged section may be rearranged in its pocket closing position after the curtain has been removed from the pocket.

2. In a vehicle provided with a hollow door constituting a pocket for storing a curtain, the door having a hinged section at the top to provide an opening giving access to said pocket, the combination with said pocket of a side curtain adapted for arranging into a rectangular flat package suitable for inserting in said pocket, means for hanging the folded curtain flatwise within said pocket, a narrow strap consisting of two detachable sections connecting one end of the curtain with said pocket thereby preventing the carrying away of the curtain, but permitting its withdrawal from its pocket for putting up in place, said hinged section of the door being provided with fastening means spaced apart to receive said strap of the curtain between them when the latter is put up, whereby the said hinged section may be rearranged in its pocket closing position after the curtain has been removed from the pocket.

SIDNEY G. SPURLING.